(No Model.)

I. KITSÉE.
SECONDARY BATTERY.

No. 505,467. Patented Sept. 26, 1893.

WITNESSES:
David G. Williams
G. Herbert Condict

INVENTOR:
Isidor Kitsée

UNITED STATES PATENT OFFICE.

ISIDOR KITSÉE, OF PHILADELPHIA, PENNSYLVANIA.

SECONDARY BATTERY.

SPECIFICATION forming part of Letters Patent No. 505,467, dated September 26, 1893.

Application filed May 23, 1892. Serial No. 434,083. (No model.)

*To all whom it may concern:*

Be it known that I, ISIDOR KITSÉE, of the city and county of Philadelphia, State of Pennsylvania, have invented a certain new and useful Improvement in Secondary Batteries, of which the following is a true and exact description, reference being had to the accompanying drawings, which form a part of this specification.

My invention relates to secondary batteries and more especially to secondary cells of the so-called multiple type in which one side of the electrode serves as the positive and the other side as the negative electrode. In such cells the electrode itself is the dividing medium between the electrolyte of one cell and the liquid of the second cell.

Attempts have been made to construct secondary cells of the multiple type based on the construction of multiple primary cells; such attempts invariably failed for the obvious reason that the dividing medium acted upon by the current became distorted, buckled, broken, allowing communication of the liquids between adjoining compartments; and it is the object of my invention to obviate the difficulties heretofore experienced.

The underlying principle of my invention is, to provide an indestructible support for electrodes of such cells, and I call such electrodes, composed of two parts—one of which is affected by the current, and the second one of which is not affected by such action—a compound-electrode.

Figure 1:
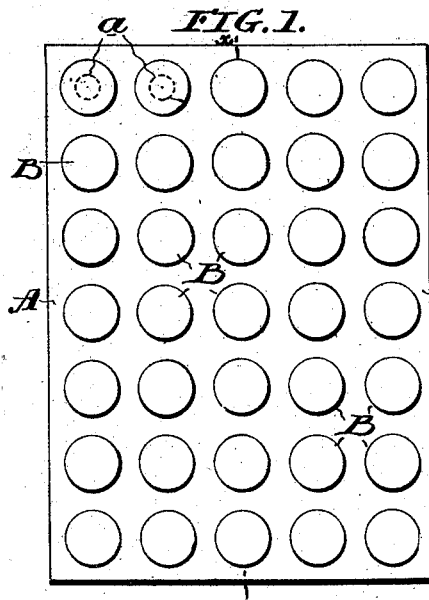
Figure 2:
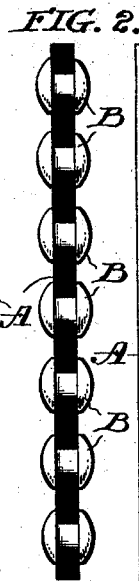
Figure 3:
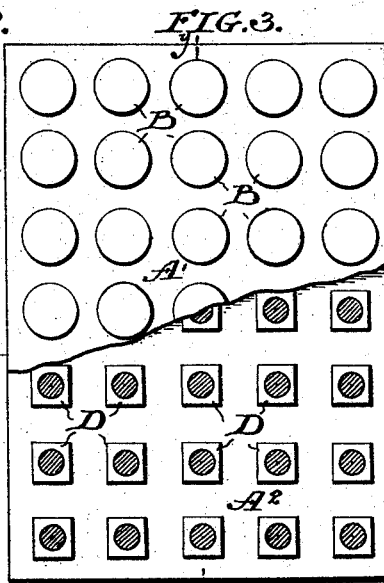
Figure 4:
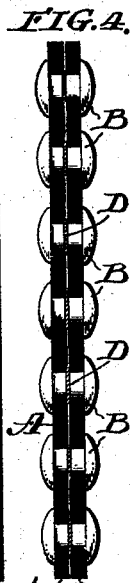
Figure 10:
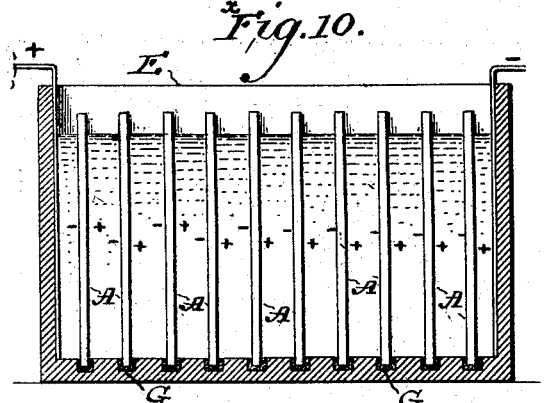
Figure 5:
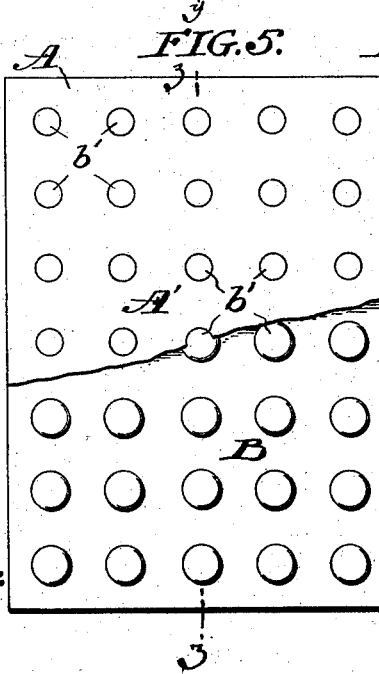
Figure 6:
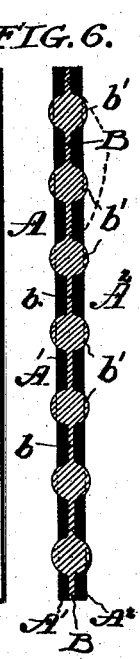
Figure 11:
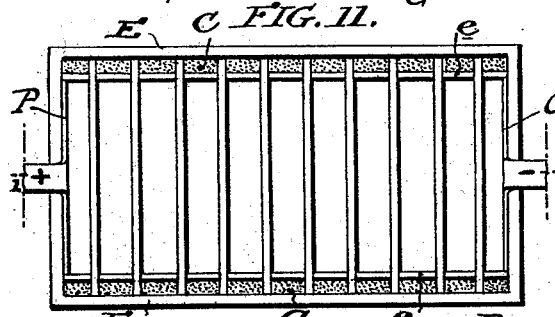
Figure 7:
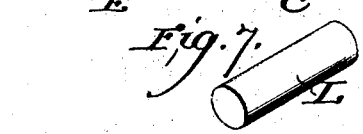
Figure 8:
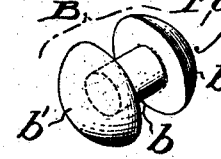
Figure 9:
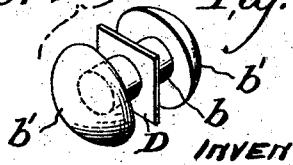

Referring to the drawings in which similar letters indicate similar parts,—Figure 1 is a side elevation of a compound-electrode embodying my invention. Fig. 2 is a section on line $x\ x$ of Fig. 1. Fig. 3 is a side elevation of a modified form, having part of the front broken away so as to show the internal structure. Fig. 4 is a section on line $y\ y$ of Fig. 3. Fig. 5 is a side elevation of a second modification having, like Fig. 3, part of the front broken away. Fig. 6 is a section on line $z\ z$ of Fig. 5. Fig. 7 is a perspective view of a blank of conducting material before being pressed into required shape. Fig. 8 is a perspective view of such blank after being pressed into shape. Fig. 9 is a perspective view of conducting material attached to a second conducting medium. Fig. 10 is a section on line 1—2 of Fig. 11; showing the construction of a battery composed of a number of compartments; and the compound electrodes and also means for conducting the current to and from the battery. Fig. 11 is a plan view of a multiple cell.

In Figs. 1 and 2,—A is the indestructible supporting medium, in which are a series of holes $a$; B is the conducting material pressed into said holes $a$.

The supporting medium may be of any of the non-conducting materials which are able to withstand the action of the electrolyte and current, such for instance, as hard rubber, porcelain, glass, soap-stone, slate and the like; and is provided with holes which are formed either in the process of casting a molding or bored in the already manufactured article. Blanks of conducting material, L Fig. 7, are placed in said holes and pressed into shapes of rivets as shown at B in Figs. 1, 2 and 8. As it is necessary that the joints between said rivets and supports should be water-tight, the sheets of supporting material are dipped into or otherwise provided with cement capable of withstanding the action of acid and current before the conducting blanks are placed in the holes or pressed into shape.

In Figs. 3 and 4 the support is composed of two sheets A' and A², provided with corresponding holes or apertures; between these sheets and over the holes are placed pieces of conducting material capable of withstanding the action of the electrolyte and current, such for instance as platinum; the platinum pieces should be somewhat larger than the holes or apertures so that the conducting pieces should be held firmly in position by the non-conducting support after the two sheets are united either through mechanical or chemical means, such, for instance, as the vulcanizing process if the sheets are composed of rubber. The conducting material designed to become active through the action of the current, is either placed on or attached to the first conducting pieces either before or after the same are embedded in the supporting-sheets. Instead of a number of small pieces of conducting material not affected by the action of the current, a whole sheet of such material may be used, or a sheet of conducting material affected by the current and electrolyte, plated or otherwise covered with a metal capable of withstanding the current's action.

Figs. 5 and 6 represent a modified form of my invention in which the conducting medium represented by B, is cast, or otherwise formed, as an entirety, and consists of the plate proper $b$, and the bulb like projections $b'$. A non-conducting medium A, composed of A' A² covers said conducting plate B, with the exception of such parts of $b'$ as are designed to come in contact with the electrolyte.

In Figs. 10 and 11,—E is a containing vessel divided into compartments by my compound-electrode A. Such containing vessel is provided, as to its bottom, with a series of parallel grooves G and is also provided with double sides, the inner parts, $e$, of said sides being provided with a series of vertical incisions, corresponding with the grooves G. The compound-electrodes are slipped or slid into said incisions and grooves and non-conducting cement C pressed into the spaces between the double sides and into the grooves, forming a water-tight joint between adjoining compartments. Instead of providing the containing vessel with double sides, I first slip the electrodes into the grooves G and replace the inner parts $e$ by removable matrices, which can be withrawn after the cement has set or hardened sufficiently not to need support. Another *modus operandi* of making the compound-electrode and vessel is: to mold the dividing or supporting partition in one part with the containing vessel and supplying such dividing partition afterward with the necessary conducting material.

The conducting material designed to become active should be lead if the battery is to be of the so-called Planté-type, but it may be of other metal such for instance as zinc capable of undergoing the necessary change through the action of the current.

As shown in Figs. 10 and 11, I provide the battery with plain terminal plates O and P. I do not, however, restrict myself to the use of such devices for conveying the current to and from the battery.

Having now described my invention, what I claim as new, and desire to secure by Letters Patent, is—

1. An electrode composed of non-conducting material supporting a plurality of conductors, said conductors extending through the support and having no metallic connection with each other outside the non-conducting material.

2. In a multiple cell, an electrode or electrodes, composed of non-conducting material supporting two or more conductors, said conductors having no metallic connection with each other, whereby in use they are electrically connected through the electrolyte only.

3. In a multiple cell, an impervious electrode or electrodes, composed of non-conducting material supporting two or more conductors, said conductors having no metallic connection with each other, whereby in use they are electrically connected through the electrolyte only.

4. A multiple cell consisting of a non-conducting containing vessel and impervious partitions dividing said vessel into two or more compartments, said partitions being composed of non-conducting material having transverse apertures and conductive material hermetically sealing said apertures, said cell being also provided with means for conducting the current to and from it.

5. An electrode consisting of a plate of impervious non-conducting material provided with a plurality of transverse apertures and conducting material arranged within and hermetically sealing said apertures, the portions of said conducting material which lie within the several apertures having no electrical connection with each other outside said plate.

6. An electrode consisting of a plate of non-conducting material provided with a plurality of transverse apertures and bodies of conducting material within and sealing hermetically said apertures, said bodies having the form of double-headed rivets and having no electrical connection with each other.

ISIDOR KITSÉE.

Witnesses:
JAMES S. PHILLIPS,
W. CHANNING NEVIN.